US010513443B2

(12) United States Patent
Khumsa-Ang et al.

(10) Patent No.: US 10,513,443 B2
(45) Date of Patent: Dec. 24, 2019

(54) PREPARATION OF MAGNETITE FROM FERROUS CHLORIDE SUBSEQUENT TO REPLACING SULPHATE IONS WITH CHLORIDE IONS

(71) Applicant: ATOMIC ENERGY OF CANADA LIMITED/ÉNERGIE ATOMIQUE DU CANADA LIMITÉE, Chalk River (CA)

(72) Inventors: Kittima Khumsa-Ang, Deep River (CA); Carl W. Turner, Deep River (CA); Jing Qian, Deep River (CA)

(73) Assignee: ATOMIC ENERGY OF CANADA LIMITED/ ÉNERGIE ATOMIQUE DU CANADA LIMITÉE, Chalk River (CA)

(*) Notice: Subject to any disclaimer, the term of this patent is extended or adjusted under 35 U.S.C. 154(b) by 0 days.

(21) Appl. No.: 15/776,804

(22) PCT Filed: Nov. 17, 2016

(86) PCT No.: PCT/CA2016/051342
§ 371 (c)(1),
(2) Date: May 17, 2018

(87) PCT Pub. No.: WO2017/083974
PCT Pub. Date: May 26, 2017

(65) Prior Publication Data
US 2018/0327276 A1 Nov. 15, 2018

Related U.S. Application Data

(60) Provisional application No. 62/256,376, filed on Nov. 17, 2015.

(51) Int. Cl.
C01G 49/00 (2006.01)
C01G 49/08 (2006.01)
G21H 5/02 (2006.01)
G21G 1/00 (2006.01)

(52) U.S. Cl.
CPC ......... *C01G 49/08* (2013.01); *C01G 49/0009* (2013.01); *G21G 1/001* (2013.01); *G21G 1/0005* (2013.01); *G21H 5/02* (2013.01); *C01P 2002/72* (2013.01); *C01P 2004/03* (2013.01); *C01P 2004/32* (2013.01); *C01P 2004/62* (2013.01); *C01P 2006/80* (2013.01)

(58) Field of Classification Search
CPC ............................ C01G 49/08; C01G 49/0009
USPC .......................................... 423/139, 632–634
See application file for complete search history.

(56) References Cited

U.S. PATENT DOCUMENTS

| 4,150,095 A | 4/1979 | Kunda et al. |
| 4,382,822 A | 5/1983 | Mayer |
| 5,589,097 A | 12/1996 | Nihira et al. |
| 2010/0061920 A1 | 3/2010 | Janak et al. |

FOREIGN PATENT DOCUMENTS

| CN | 102020319 A | 4/2011 |
| CN | 104478002 A | 4/2015 |
| WO | 2014/085651 A1 | 6/2014 |
| WO | 2015/048907 A1 | 4/2015 |
| WO | 2017/083974 A1 | 5/2017 |

OTHER PUBLICATIONS

Translation of CN 1-04478002A, Apr. 1, 2015. (Year: 2015).*
Extended European search report dated Nov. 8, 2018 in respect of European Application No. 16865353.3.
International Preliminary Report on Patentability dated May 22, 2018 in respect of International Application No. PCT/CA2016/051342.
Purolite Ion Exchange Resins, Purolite International Limited, Dec. 2004.
Carl W. Turner et al., "Formation of Corrosion Productions of Carbon Steel under Condenser Operating Conditions", Nulcear Plant Chemistry Conference, Paris, 2012.
Sugimoto et al., "Formation of Uniform Spherical Magnetite Particles by Crystallization from Ferrous Hydroxide Gels", Journal of Colloid and Interface Science, vol. 74, No. 1, Mar. 1980.

* cited by examiner

*Primary Examiner* — Steven J Bos
(74) *Attorney, Agent, or Firm* — Bereskin & Parr LLP/S.E.N.C.R.L., s.r.l.

(57) ABSTRACT

A method of preparing magnetite particles may include providing a first solution of substantially ferrous sulphate. The first solution may be converted by replacing sulphate ions with chloride ions to produce a second solution of substantially ferrous chloride. The second solution may be oxidized to produce a third solution of substantially iron oxide. A system for purifying a solution of substantially iron oxide may include a solution reservoir, at least one membrane unit, and at least one pump for circulating the solution between the solution reservoir and the membrane unit. The solution may be delivered from the solution reservoir to an inlet of the membrane unit, and/or the solution may be returned from an outlet of the membrane unit to the solution reservoir.

20 Claims, 4 Drawing Sheets

PREPARATION OF MAGNETITE FROM FERROUS CHLORIDE SUBSEQUENT TO REPLACING SULPHATE IONS WITH CHLORIDE IONS

CROSS-REFERENCE TO RELATED APPLICATIONS

This is a national stage application of International Application No. PCT/CA2016/051342 filed on Nov. 17, 2016, which claims priority to U.S. Provisional Application No. 62/256,376 filed on Nov. 17, 2015, the entire contents of which are hereby incorporated herein by reference.

FIELD

The present disclosure relates to materials science and nuclear technology.

INTRODUCTION

The following paragraphs are intended to introduce the reader to the detailed description that follows and not to define or limit the claimed subject matter. Furthermore, the following paragraphs are not an admission that anything discussed in them is prior art or part of the knowledge of persons skilled in the art.

Magnetite is an iron oxide corrosion product that may be found in feedwater systems in nuclear power plants. The deposition of magnetite on heat transfer surfaces, e.g., steam generator (SG) tubes, may result in increased thermal resistance to heat transfer, and in extreme cases flow oscillations and loss of SG level control.

Magnetite particles may be employed in fouling experiments which attempt to simulate accumulation of deposit on a heat transfer surface. Furthermore, radiotracing techniques may be used to investigate kinetics of fouling processes under various thermal hydraulic and chemistry conditions (e.g., at various steam qualities). Radiotracing techniques may provide a direct measure of the deposit mass per unit area on a test section without requiring additional assumptions regarding the physical properties of the deposit, such as density and thermal conductivity.

A reliable and reproducible method to produce high quality iron oxide products, for use in fouling experiments, is desirable. The quality of the synthesized magnetite products may be determined by the composition (i.e. purity) and morphology (i.e. correct phase, uniform size, and shape) of the particles.

Radiotraced magnetite has been prepared by neutron activation of magnetite particles. Alternatively, it is possible to use wet chemical methods to produce radiotraced magnetite from a radioactive solution containing the desired iron isotope. However, the counter ion in a commercially available radioactive solution is the sulphate ion ($SO_4^{2-}$), which may be strongly adsorbed to the magnetite surface and could interfere with the synthesized particle.

The inventors of the present disclosure have developed a process to convert $FeSO_4$ into $FeCl_2$ using an ion-exchange resin as a starting solution for the synthesis of colloidal magnetite. The process may be repeated using radiotraced $^{59}FeSO_4$ solution to produce $^{59}FeCl_2$. The inventors used the ion-exchange resin (e.g., PUROLITE® NRW 400™ resin) to substitute anions (e.g., sulphate is replaced with chloride ion) followed by the production of colloidal magnetite. Results from particle characterization confirm the high quality (i.e. high purity with magnetite phase structure) of the synthesized corrosion product. The particle morphology was examined using the X-Ray Diffraction (XRD) and Scanning Electron Microscopy (SEM). Semi-quantitative analyses of the oxide composition were performed using Energy Dispersive X-Ray Spectroscopy (EDX).

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Figure 1:
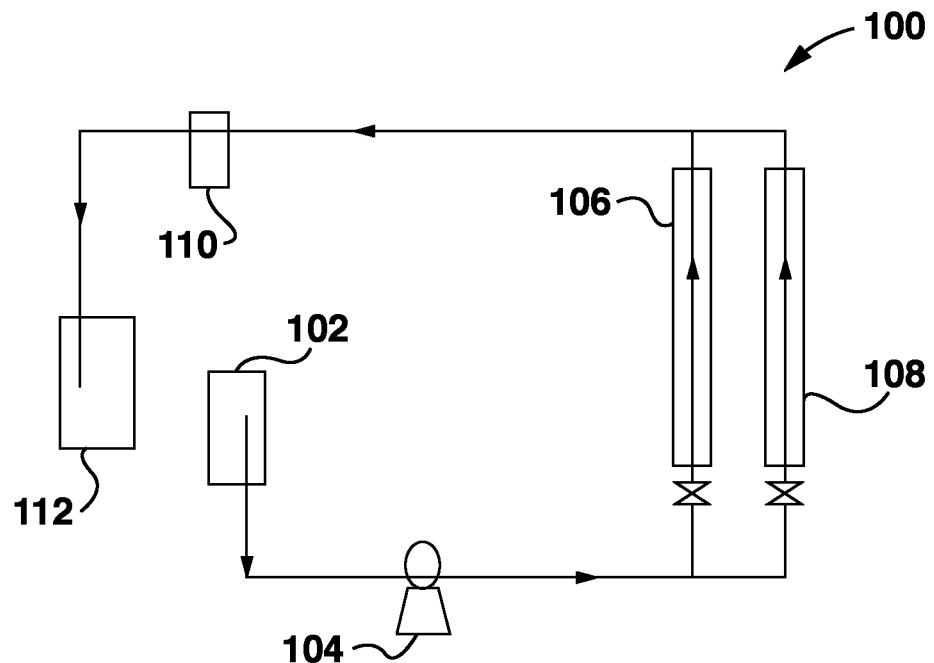
FIG. 1 is a schematic diagram of an exemplary ion-exchange apparatus.

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

The present disclosure is directed to methods that can produce low impurity magnetite particles. Generally, the methods may involve: providing a first solution of substantially ferrous sulphate; converting the first solution by replacing sulphate ions with chloride ions to produce a second solution of substantially ferrous chloride; and oxidizing the second solution to produce a third solution of substantially iron oxide.

The preparation of magnetite by direct oxidation of a solution containing Fe(II) under alkaline conditions and at low temperature can provide magnetite of high quality (i.e. high purity iron oxide, correct phase and uniform size and shape). Colloidal magnetite may be employed effectively as a radiotracer, which is a key component for in situ measurement of fouling using gamma spectrometry. Sulphate in a ferrous solution can be replaced by chloride resulting in a $FeCl_2$ solution eluted from an ion-exchange process. As demonstrated herein, magnetite particles produced from this method exhibited a typically spherical shape with diameter between 0.1 to 1.0 micrometers and approximately 99% purity.

In accordance with the teachings of the present disclosure, the sulphate in commercially available $^{59}FeSO_4$ solution may also be converted into $^{59}FeCl_2$.

Preparation of $FeCl_2$ Solution from $FeSO_4$

The ion-exchange resin, PUROLITE® NRW 400™ resin, was used to replace sulphate ions from the $FeSO_4$ solution with chloride ions. PUROLITE® NRW 400™ resin is a strongly basic ion-exchange resin with (OH$^-$) functional group. It has an "as received" form of a clear spherical bead. The resin was pretreated with deionized water to remove dirt before use.

Fresh resins showed uniform structure and smooth surface with the particle sizes ranging between about 0.3 and 0.6 mm.

Laboratory grade chemicals were used, and are listed in Table 1.

TABLE 1

Chemicals used in magnetite synthesis from $FeSO_4$ solution

| | Chemical | Approximate Concentration | Supplier |
|---|---|---|---|
| For Anion Conversion | NRW 400 ™ resin (solid) | 1.0 eq/L | Purolite |
| | HCl (aqueous) | 0.1 and 0.5 mol/L | Anachemia |
| | $FeSO_4$ (aqueous) | 0.1 mol/L | Fisher Scientific |

The nature of the ion-exchange resin may be greatly influenced by the network structure of its polymer matrix. The polymer matrix of most ion-exchange resins is mainly a copolymer of styrene and divinylbenzene (DVB). The functional group of the strong anion resin used by the inventors is originally in OH$^-$ form. The equilibrium can be written as shown in Equation 1.

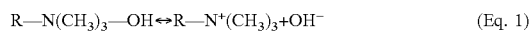

R—N(CH$_3$)$_3$—OH ↔ R—N$^+$(CH$_3$)$_3$+OH$^-$  (Eq. 1)

A solution of target anion, i.e. Cl$^-$ as HCl, is introduced to establish the chloride form of the resin; the equilibrium can be written as shown in Equation 2. An excess amount of Cl favors the production of chloride saturated resin.

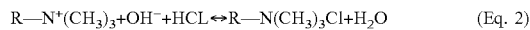

R—N$^+$(CH$_3$)$_3$+OH$^-$+HCL ↔ R—N(CH$_3$)$_3$Cl+H$_2$O  (Eq. 2)

In the final step, the original solution containing sulphate is introduced to the resin column to form a final product that contains chloride ion. At this stage, the equilibrium equation is shown by Equation 3.

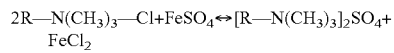

2R—N(CH$_3$)$_3$—Cl+FeSO$_4$ ↔ [R—N(CH$_3$)$_3$]$_2$SO$_4$+FeCl$_2$  (Eq. 3)

The anion to be replaced, i.e. sulphate in this case, must have a higher ion selectivity for the ion-exchange resin than the ion which is on the resin, i.e. the chloride ion. The relative selectivity for strong acid forming anions in a dilute solution is as follows: $SO_4^{2-}>I^->NO_3^->CrO_4^{2-}>Br^->Cl^-$. According to this series, therefore, a sulphate anion will readily displace a chloride anion on the resin. It is noted that the ion-exchange capacity of PUROLITE® NRW 400™ resin is 1.0 eq/L of resin. To convert 1 L of 0.1 mol/L $FeSO_4$ solution, which gives 0.2 equivalents of sulphate, the required volume of resin is 200 mL. In addition, at least 2 L of 0.1 mol/L of HCl solution is required to saturate 200 mL of resin.

Fourteen tests were carried out to study the variation in the addition rate and the amount of resin used. An exemplary ion-exchange apparatus is shown in FIG. 1.

Referring to FIG. 1, the ion-exchange apparatus is illustrated generally at reference numeral 100. In the example illustrated, the apparatus 100 includes a solution tank 102 and a pump 104. The pump 104 drives solution from the tank 102 to first and second ion-exchange columns 106, 108, which are shown arranged and connected in parallel. An online pH measurement device 110 is positioned to read the pH of the solution flowing from the ion-exchange columns 106, 108 to a product collection reservoir 112.

The aim was to produce approximately 1 L of $FeCl_2$ solution for the magnetite synthesis. The first six experiments were carried out by manually adding solutions (once through) from the top of the resin column. Based on the sulphate removal ratio obtained from manual addition experiments, the procedure for the preparation of $FeCl_2$ from $FeSO_4$ using PUROLITE® NRW 400™ resin utilized a continuous feed system using the pump 104 (e.g., a peristaltic pump) to provide a constant feeding rate. The arrangement aimed to improve the flow control for the remaining experiments. At the end of each test, the final solution was analyzed for Cl$^-$ and $SO_4^{2-}$ using Ion Chromatography (IC). Results were reported as sulphate removal ratio calculated from the amount of removed sulphate divided by amount of sulphate in the $FeSO_4$ feed solution. A summary of the ion-exchange experiments is listed in Table 2. Experimental reproducibility was verified by duplicate experiments in runs 13 and 14.

TABLE 2

Summary of ion-exchange experiments

| Run | Volume of Resin (mL) | Volume of HCl (mL) | Equivalent Ratio of HCl to Resin Site | Volume of 0.1M FeSO$_4$ (mL) | Concentration of Chloride in Effluent (mg/L) | Concentration of Sulphate in Effluent (mg/L) | Sulphate Removal Ratio |
|---|---|---|---|---|---|---|---|
| 1 | 50 | 600 | 1.2 | 300 | 2671 | 5851 | 0.44 |
| 2 | 50 | 600 | 1.2 | 300 | 4052 | 3759 | 0.64 |
| 3 | 100 | 600 | 0.6 | 300 | N/A | N/A | N/A |
| 4 | 100 | 1200 | 1.2 | 300 | 5152 | 1821 | 0.83 |
| 5 | 150 | 1800 | 1.2 | 300 | 6063 | 974 | 0.91 |
| 6 | 150 | 2000 | 1.3 | 300 | 6732 | 694 | 0.93 |
| 7 | 500 | 8000 | 1.6 | 2000 | 2342 | 6572 | 0.37 |
| 8 | 250 | 4000 | 1.6 | 2000 | 6011 | 1066 | 0.90 |
| 9 | 250 | 4000 | 1.6 | 2000 | 6092 | 1078 | 0.90 |
| 10 | 300 | 5000 | 1.6 | 1000 | 5018 | 2470 | 0.76 |
| 11 | 350 | 2000 | 2.9 | 1400 | 6696 | 1410 | 0.86 |
| 12 | 350 | 1500 | 2.1 | 1400 | 6626 | 756 | 0.93 |
| 13 | 400 | 1500 | 1.9 | 1100 | 7435 | 256 | 0.98 |
| 14 | 400 | 1500 | 1.9 | 1100 | 7456 | 548 | 0.95 |

Fresh PUROLITE® NRW 400™ resin was pretreated by generously flushing resin beads with deionized water (approximately 10 times of the resin volume) to ensure no channels that would allow solution by pass the resin when solution flowed through the column. Visual observation was made for water channels and/or bubbles between the resin beads. HCl solution was introduced to convert the resin to the Cl⁻ form as established in Equation 2. The ratio of HCl to resin site can be calculated as shown Equation 4.

$$\frac{\text{Concentration}_{HCl}(\text{mol/L}) \times \text{Volume}_{HCl}(\text{mL})}{\text{Volume}_{resin}(\text{mL}) \times \text{Exchange capacity}_{resin}(1.0 \text{ eq/L})} \quad \text{(Eq. 4)}$$

An excess of Cl⁻ as given by the ratio of HCl to resin site (in Table 2) was used. The molar equivalent ratio of HCl to resin was varied from 0.6 to 2.9 for various resin volumes.

When the ratio of HCl to resin site was below 1.0, as shown in run 3, there was incomplete conversion of OH⁻ into Cl⁻ resulting in the formation of a dark green precipitate, likely ferrous hydroxide. Run 3 was stopped and aborted due to the plugged column.

After the manual addition experiments, continuous flow was used for the remaining runs 7 to 14. The resin volume was increased to 500 mL in run 7, the first continuous flow experiment. The service flow rate was chosen at 3 to 4 bed volumes per hour, with bed volume referring to the volume of resin used in the experiment. The chosen flow rate reflected the high ion-exchanger capacity and the capability to maintain a steady flow in the system set up in FIG. 2. At relatively large resin volume and the top to bottom flow direction in run 7, it was observed that the volume of the resin was reduced after the acid flow indicating that resin beads have shrunk during the acid flow resulting in bubbles and air channels inside a column. Air bubbles affected directly the ion-exchange capacity (between Cl⁻ and $SO_4^{2-}$). The sulphate removal ratio dropped to 0.37 in run 7.

The downside of dealing with a large resin volume (at 500 mL resin compared to 50, 100, and 150 mL in previous runs) was that several hours were consumed when large amounts of HCl solution are required to saturate the resin. As a consequence, the concentration of HCl was raised to 0.5 mol/L (in run 11) in order to produce target amount of final product (e.g., 1 L of 0.1 mol/L $FeCl_2$ solution). The ratio of HCl to resin site increased by 80% in run 11 compared to run 10, however, the capability to remove sulphate ions only increased by 13%. It is noted that a 0.1 mol/L HCL solution was fed into the resin column for runs 1 to 10, a 0.5 mol/L HCL solution was fed into the resin column for runs 11 to 14, and the direction of flow in runs 11 to 14 was reversed (i.e. from bottom to top of the resin column) to ensure no air bubble formed during the operation. In runs 12 to 14, the volume of acid solution was lowered to 1500 mL for shorter flow duration. Based on the sulphate removal ratios in Table 2, the optimum parameters were suggested to be as follows:

The ratio of HCl to resin site must be at least approximately 2.0 to achieve more than 93% replacement of sulphate with chloride.

The recommended flow control for the small scale batch production is the reverse flow direction with the operating flow rate between 3 to 4 bed volumes per hour to maximize the ion-exchange capacity.

The higher concentration of HCl may be chosen to reduce the time the solution takes to flow through the resin column. However, care must be taken when handling with strong acid solution. For example, an HCl solution higher than 6.0 mol/L may require use of a certified fume hood.

The maximum sulphate removal is reported at 98% in run 13. The final solution from runs 13 and 14 were then used as a starting material for the synthesis of magnetite discussed below.

Preparation of Colloidal Magnetite

Magnetite was prepared by direct oxidation of a solution of $FeSO_4$ containing Fe(II) at low temperature. Operational experience suggested that the removal of sulphate from the final product was difficult because of the tendency of sulphate to adsorb onto the surface of the particles. In other words, a residual amount of sulphate ion may be hard to remove from the particle surface and also may induce particle agglomeration in the suspension.

1 L of 0.1 mol/L of $FeSO_4$ was replaced by 1 L of 0.1 mol/L $FeCl_2$ eluted from an ion-exchange process. The solution was purged with argon gas for one hour prior to a drop wise addition of 1 mol/L NaOH solution (approximately 200 to 300 mL) to raise the pH of the solution to about 11.0. Greenish particles were formed confirming the presence of ferrous oxide. The suspension was heated to 90° C. for one hour and sparged with air to produce oxidizing conditions. In this stage, the suspension color turned black consistent with the formation of magnetite particle.

The synthesised particles were purified by recirculating the suspension through a double column dialysis membrane system. An exemplary purification system is shown in FIG. 2.

Figure 2:
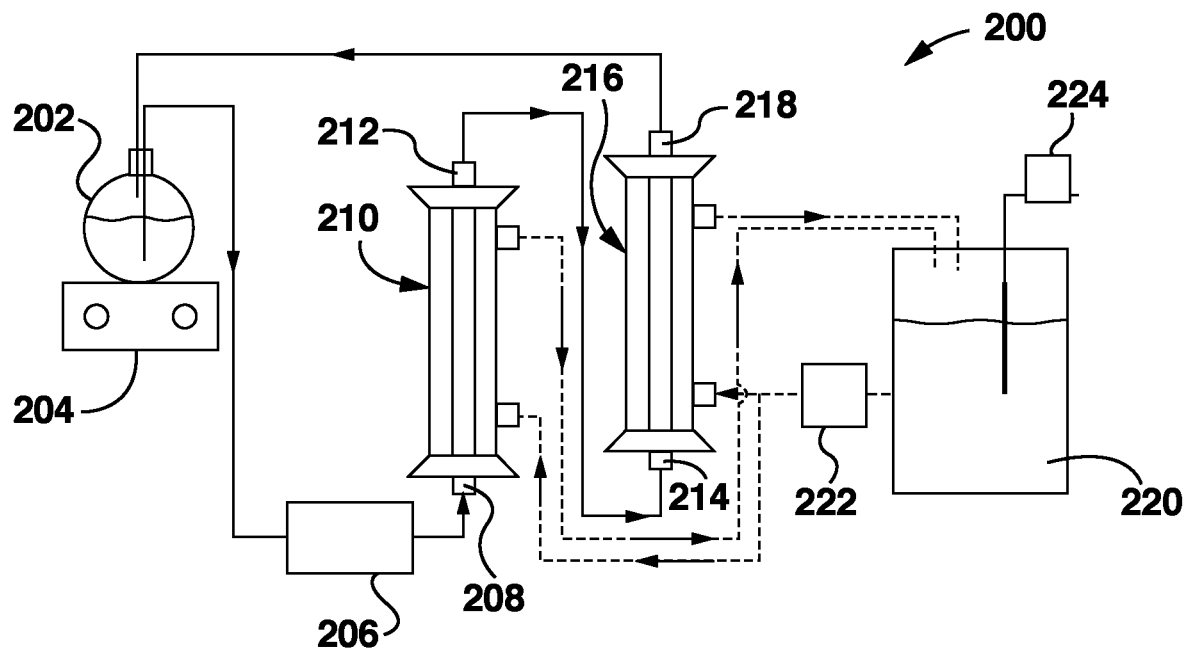
FIG. 2 is a schematic diagram of an exemplary purification system.

Referring to FIG. 2, the purification system is illustrated generally at reference numeral 200. In the example illustrated, the system 200 includes a solution reservoir 202 having a stirring device 204 arranged to stir iron oxide solution in the reservoir 202. A pump 206 draws a first stream of the solution from the reservoir 202 and delivers it to an inlet 208 of a first membrane unit 210. In the example illustrated, an outlet 212 of the first membrane unit 210 is connected to an inlet 214 of a second membrane unit 216 to deliver a second stream of the solution to the second membrane unit 216. The first and second membrane units 210, 216 are shown arranged and connected in parallel. An outlet 218 of the second membrane unit 216 returns a third, purified stream of the solution back to the reservoir 202 after completing one cleaning cycle.

The membrane units 210, 216 may each take the form of a double-column dialysis membrane device (e.g., supplied by Spectrum Labs, Rancho Dominguez, Calif.). As illustrated, the membrane units 210, 216 may be connected to a deionized water source 220, and a pump 222 may circulate water between the source 220 and the membrane units 210, 216. A measurement tool 224 may be used to monitor conductivity of water in the source 220.

Excess ions were removed from the particles by osmosis through the membrane units 210, 216. The suspension of iron oxide and the deionized water flow on the inside and outside of the membrane, respectively. Deionized water from the source 220 was replaced regularly in the membrane units 210, 216 until the conductivity of the dialysate was below 5 μs/cm. At this point, the suspension may be transferred to a particle carboy, and may be stored until eventual use in a fouling experiment.

For the purpose of particle characterization, an aliquot of suspension was filtered using 0.45 μm filter paper and left to dry under room temperature. The magnetite powder was submitted for analyses.

Results from Characterization of Magnetite

Two magnetite batches were obtained from the syntheses using $FeCl_2$ eluted from runs 13 and 14. They are labelled as batches MM1 and MM2, respectively.

Figure 3:
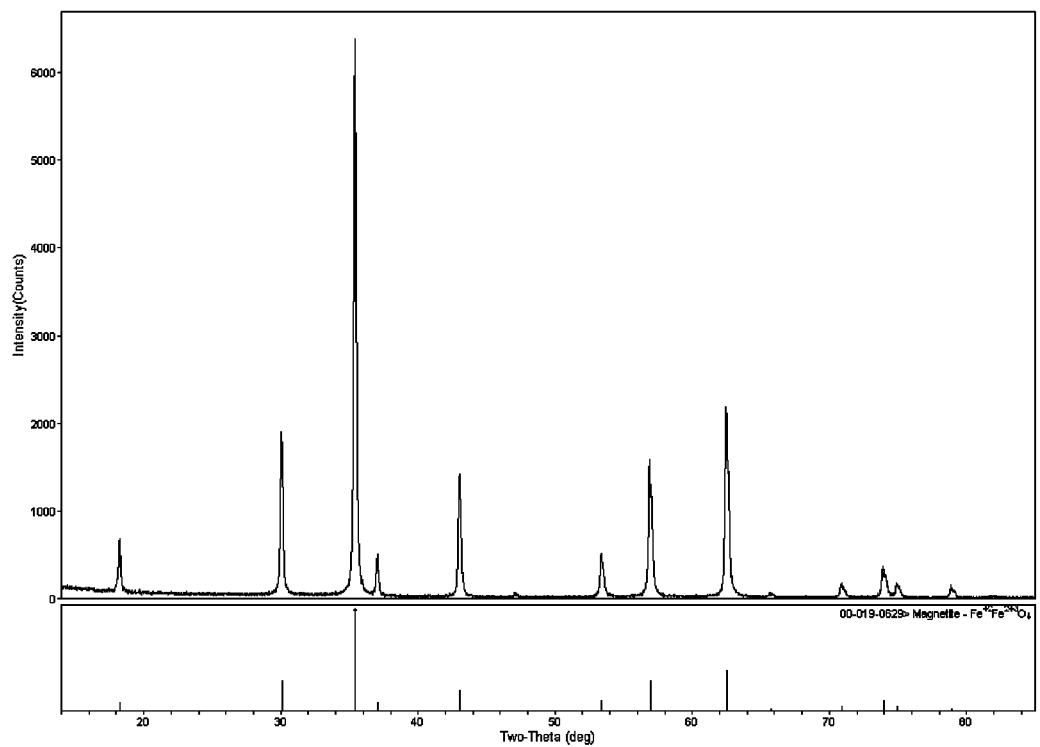
FIGS. 3 and 4 show XRD patterns for magnetite.
Figure 4:
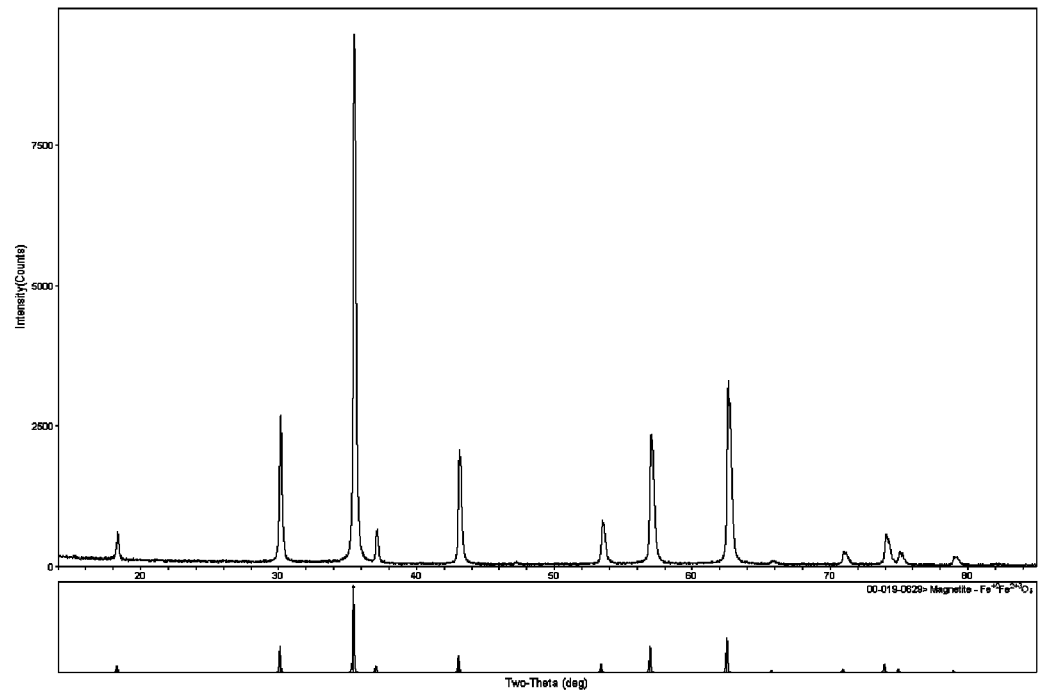

XRD analysis was conducted to distinguish different iron oxides such as magnetite, hematite, maghemite and other corrosion products containing only Fe and O. Similar XRD patterns are shown in FIGS. 3 and 4 for magnetite particles synthesised from $FeCl_2$ eluted from ion-exchange process. Sharp peaks show high degree of crystallinity of the synthesised particles.

The results from XRD analysis shows that all diffraction peaks of each sample matched the diffraction peaks for pure magnetite ($Fe_3O_4$) from the International Centre for Diffraction Data database (ICDD). Observed peaks from XRD were only for magnetite. The XRD results also confirmed the purity of the products via the absence (or the amount of others are below the detection limit of approximately 1 weight % of the instrument) of other phases of iron oxide (i.e. maghemite or hematite) in the samples.

Figure 5:
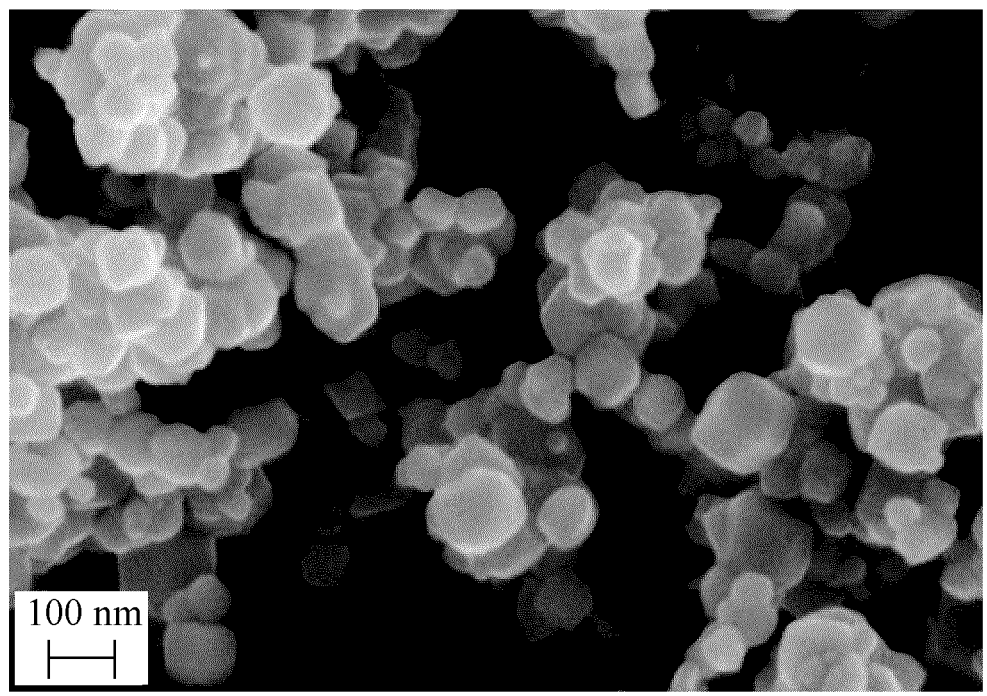
FIGS. 5 and 6 are SEM micrographs (50,000×) of magnetite.
Figure 6:
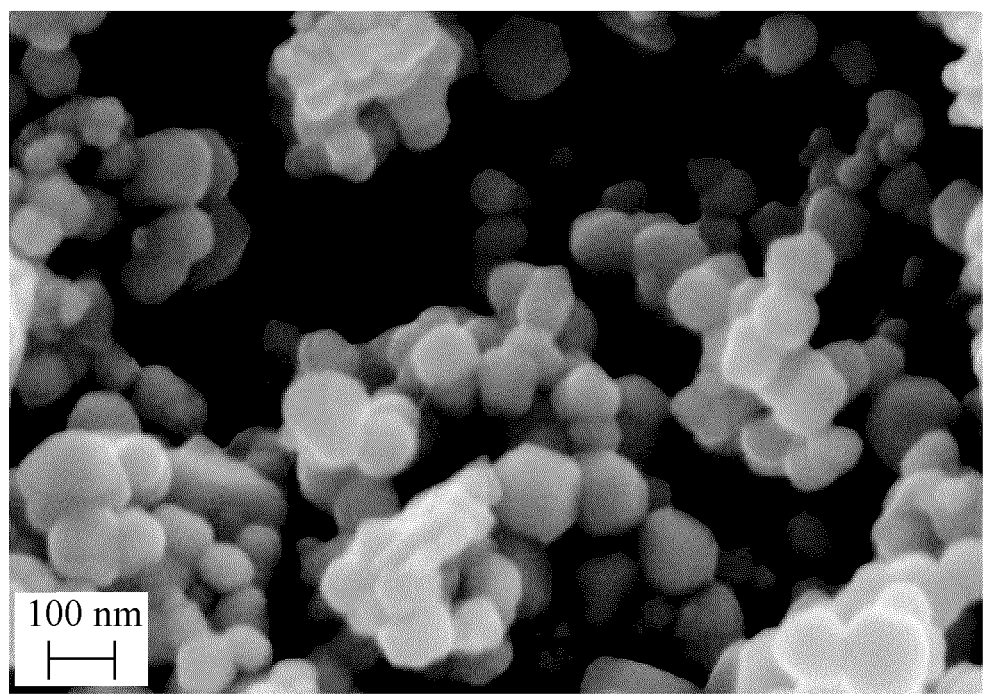

Micrographs are shown in FIGS. 5 and 6. It is assumed that a single crystal in SEM micrograph is the particle which has a grain boundary that could clearly be distinguished from others. The resulting magnetite particles were colloidal with diameters of few hundred nanometers. The particles are typically in spherical shape. The results from SEM micrographs showing spherical particles with the particle diameter between 0.2 to 1.0 micrometers.

Figure 7:
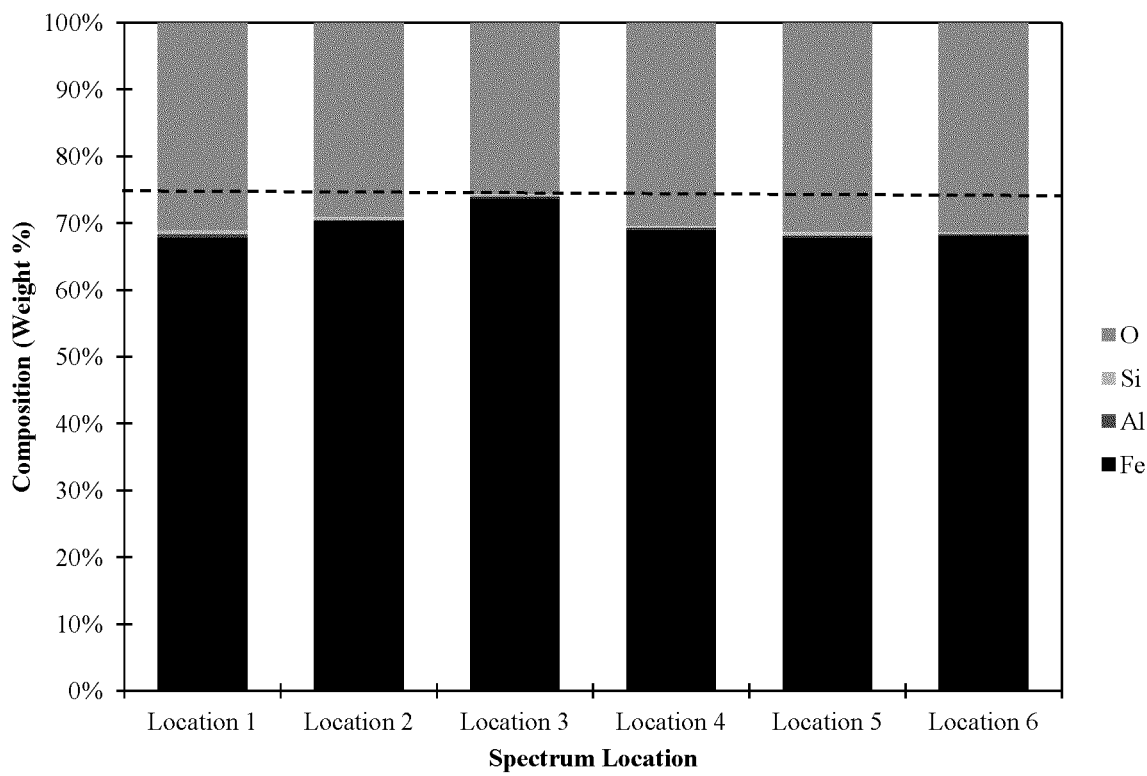
FIGS. 7 and 8 are charts showing elemental compositions of magnetite.
Figure 8:
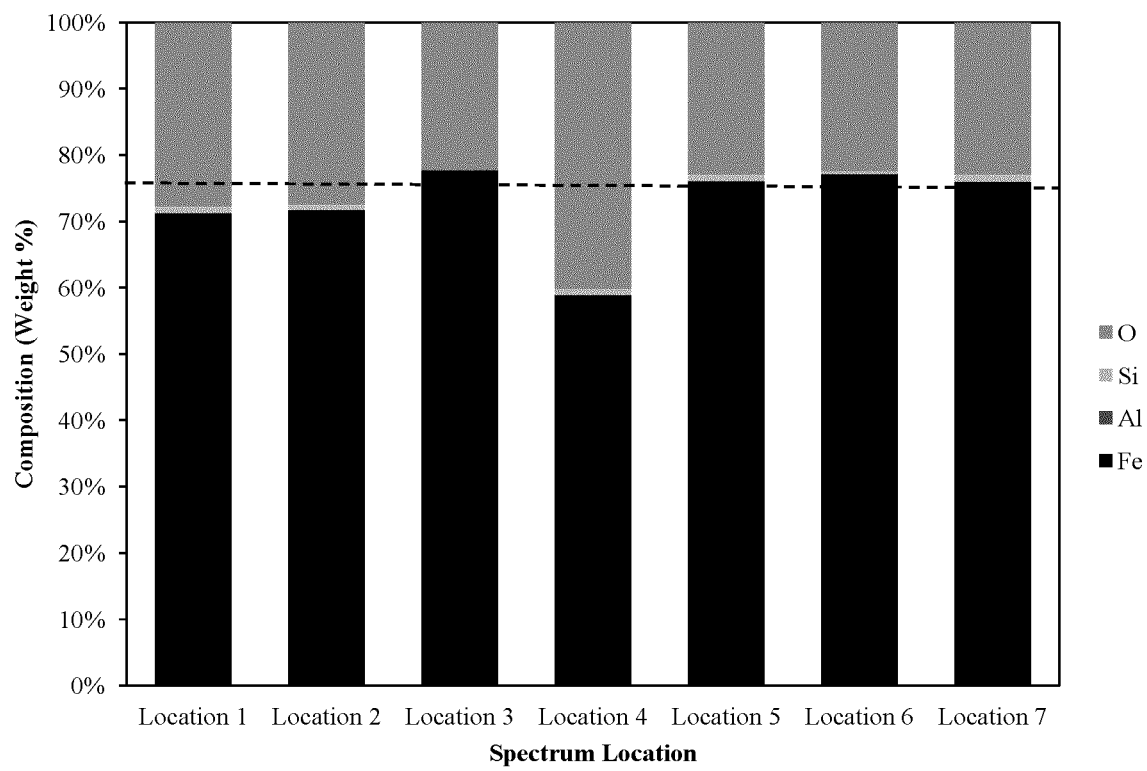

The EDX analysis was performed on the representative areas of the magnetite powder prepared from the final solution $FeCl_2$ from runs 13 and 14. As expected, the powder samples (MM1 and MM2) were rich in Fe with trace amounts of Si and Al (each less than 0.6 wt %) in batch MM1 (from run 13; FIG. 7) and only Si was reported at concentration less than 0.6 wt % in batch MM2 (from run 14; FIG. 8). Dotted lines in FIGS. 7 and 8 represent the amount of iron in $Fe_3O_4$ molecule from theoretical calculation.

The methods disclosed herein may be used to produce radioactive colloidal iron oxides, which may be employed as a radiotracer. Accordingly, the radiotracer may be manufactured in a laboratory environment, the time an operator is being exposed to the radioisotope may be minimal, and the production time may be manageable. The radiotracer can be used to measure a real-time deposition rate under elevated pressure/temperature. This radiotracing technique may be used to investigate the deposit accumulation in SG tubes, for example.

Although the present disclosure relates particularly to the preparation of magnetite particles for use in fouling experiments for SG tube coatings and adsorption studies, it should be appreciated that the synthesized magnetite may be used as a model particle in other works requiring low impurities in the system. Other applications of the teachings herein are contemplated.

While the above description provides examples of one or more apparatuses or methods, it will be appreciated that other apparatuses or methods may be within the scope of the accompanying claims.

We claim:

1. A method of preparing magnetite particles, comprising:
providing a first solution of substantially ferrous sulphate;
converting the first solution by replacing sulphate ions with chloride ions to produce a second solution of substantially ferrous chloride; and
oxidizing the second solution to produce a third solution of substantially iron oxide in the form of the magnetite particles,
wherein the step of converting comprises using an ion-exchange resin.

2. The method of claim 1, wherein the step of converting comprises passing the first solution through at least one ion-exchange column housing the ion-exchange resin.

3. The method of claim 2, wherein the step of passing comprises flowing the first solution upwardly through the ion-exchange resin in the at least one ion-exchange column.

4. The method of claim 3, wherein the step of flowing comprises controlling a flow rate of the first solution between 3 to 4 bed volumes per hour.

5. The method of claim 2, wherein the step of converting comprises passing the first solution through a plurality of the ion-exchange columns in parallel.

6. The method of claim 1, further comprising, prior to the step of converting, introducing hydrogen chloride to the ion-exchange resin.

7. The method of claim 6, wherein the step of converting comprises maintaining a ratio of HCl to resin site of at least approximately 2.0.

8. The method of claim 6, further comprising, prior to the step of introducing, flushing the ion-exchange resin with deionized water.

9. The method of claim 1, further comprising collecting the second solution in a product collection reservoir, and measuring pH of the second solution in the product collection reservoir and/or flowing to the product collection reservoir.

10. The method of claim 1, further comprising, prior to the step of oxidizing, purging the second solution with an inert gas.

11. The method of claim 1, wherein the step of oxidizing comprises adjusting a pH of the second solution.

12. The method of claim 11, wherein the step of adjusting comprises adding an alkaline solution.

13. The method of claim 12, wherein the alkaline solution is NaOH.

14. The method of claim 1, wherein the step of oxidizing comprises heating the second solution and sparging the second solution with an oxidizing fluid.

15. The method of claim 14, wherein the oxidizing fluid is air.

16. The method of claim 1, further comprising, after the step of oxidizing, purifying the third solution.

17. The method of claim 16, wherein the step of purifying comprises removing excess ions from the third solution.

18. The method of claim 17, wherein the step of purifying comprises flowing the third solution through at least one membrane dialysis unit.

19. The method of claim 1, further comprising filtering and drying the third solution to yield the magnetite particles.

20. The method of claim 1, wherein the first solution consists of a solution of $^{59}FeSO_4$, and the second solution consists of a solution of $59FeCl_2$.

* * * * *

UNITED STATES PATENT AND TRADEMARK OFFICE
CERTIFICATE OF CORRECTION

PATENT NO. : 10,513,443 B2
APPLICATION NO. : 15/776804
DATED : December 24, 2019
INVENTOR(S) : Kittima Khumsa-Ang et al.

It is certified that error appears in the above-identified patent and that said Letters Patent is hereby corrected as shown below:

In the Claims

At Column 8, Line 61, Claim 20 delete "59FeCl$_2$" and insert --$^{59}$FeCl$_2$--.

Signed and Sealed this
Twenty-second Day of September, 2020

Andrei Iancu
*Director of the United States Patent and Trademark Office*